US010270804B2

(12) United States Patent
Niemela

(10) Patent No.: US 10,270,804 B2
(45) Date of Patent: Apr. 23, 2019

(54) DETECTION OF WEBCAM ABUSE

(71) Applicant: F-Secure Corporation, Helsinki (FI)

(72) Inventor: Jarno Niemela, Kirkkonummi (FI)

(73) Assignee: F-Secure Corporation, Helsinki (FI)

( * ) Notice: Subject to any disclaimer, the term of this patent is extended or adjusted under 35 U.S.C. 154(b) by 40 days.

(21) Appl. No.: 14/821,888

(22) Filed: Aug. 10, 2015

(65) Prior Publication Data
US 2016/0050220 A1 Feb. 18, 2016

(30) Foreign Application Priority Data

Aug. 13, 2014 (GB) .................................. 1414370.5

(51) Int. Cl.
H04L 29/06 (2006.01)
G06F 21/56 (2013.01)
G06F 21/83 (2013.01)

(52) U.S. Cl.
CPC .......... *H04L 63/145* (2013.01); *G06F 21/566* (2013.01); *G06F 21/83* (2013.01); *H04L 63/10* (2013.01)

(58) Field of Classification Search
CPC . H04L 63/145; H04L 63/10; H04L 29/06911; H04L 29/06925; H04L 29/06931; H04L 29/06938; G06F 21/55
USPC .......................................................... 726/23
See application file for complete search history.

(56) References Cited

U.S. PATENT DOCUMENTS

| 7,675,529 | B1* | 3/2010 | Brunner | G06F 17/211 345/660 |
| 8,607,340 | B2* | 12/2013 | Wright | G06F 21/552 726/22 |
| 8,774,761 | B2* | 7/2014 | Paddon | H04M 1/66 455/410 |
| 9,047,463 | B2* | 6/2015 | Porras | G06F 21/53 |
| 9,588,661 | B1* | 3/2017 | Jauhal | G06F 3/04842 |
| 9,679,134 | B1* | 6/2017 | Jing | G06F 21/56 |
| 2007/0002129 | A1* | 1/2007 | Benco | H04N 7/147 348/14.02 |
| 2008/0030425 | A1* | 2/2008 | Fullerton | G06F 3/1423 345/1.1 |
| 2008/0086775 | A1* | 4/2008 | Repasi | G06F 21/55 726/24 |
| 2008/0262990 | A1* | 10/2008 | Kapoor | G06F 9/505 706/20 |
| 2009/0257623 | A1* | 10/2009 | Tang | G11B 27/034 382/107 |
| 2010/0077483 | A1* | 3/2010 | Stolfo | G06F 21/554 726/24 |
| 2010/0165169 | A1* | 7/2010 | Bilbrey | G06F 1/1605 348/333.01 |

(Continued)

FOREIGN PATENT DOCUMENTS

CN 103544435 A * 1/2014

Primary Examiner — Shahriar Zarrineh
(74) Attorney, Agent, or Firm — Harrington & Smith

(57) ABSTRACT

A method of detecting unauthorized use of a webcam or a microphone on a computer system, the method including, at the computer, identifying a process that is using the webcam or the microphone, determining whether information is visibly displayed by the computer system to indicate to a user the use of the webcam or the microphone by the process; and using a result of the step of determining to identify said process as malware or potential malware.

7 Claims, 3 Drawing Sheets

(56) References Cited

U.S. PATENT DOCUMENTS

| | | | |
|---|---|---|---|
| 2011/0126119 A1* | 5/2011 | Young | G06F 3/048 715/744 |
| 2012/0151606 A1 | 6/2012 | Hannon | 726/29 |
| 2013/0097660 A1* | 4/2013 | Das | H04L 63/10 726/1 |
| 2013/0222609 A1* | 8/2013 | Soffer | G03B 11/043 348/207.1 |
| 2013/0232540 A1* | 9/2013 | Saidi | G06F 21/6218 726/1 |
| 2013/0246800 A1* | 9/2013 | Stewart | G06F 21/32 713/176 |
| 2013/0249699 A1 | 9/2013 | Liu | 340/654 |
| 2013/0286224 A1* | 10/2013 | Stedman | H04L 63/0281 348/207.1 |
| 2013/0286225 A1* | 10/2013 | Stedman | H04N 21/4223 348/207.1 |
| 2014/0053260 A1* | 2/2014 | Gupta | G06F 21/50 726/22 |
| 2014/0101748 A1* | 4/2014 | Ancona | G06F 21/566 726/12 |
| 2014/0143864 A1* | 5/2014 | Miliefsky | H04L 63/20 726/22 |
| 2014/0199664 A1* | 7/2014 | Sadeh-Koniecpol | G09B 5/00 434/118 |
| 2014/0282908 A1* | 9/2014 | Ward | H04W 12/12 726/4 |
| 2014/0289836 A1* | 9/2014 | Bastian | H04L 63/08 726/7 |
| 2015/0009399 A1* | 1/2015 | Jonsson | G06F 1/1656 348/373 |
| 2015/0082430 A1* | 3/2015 | Sridhara | G06F 21/566 726/23 |
| 2015/0150130 A1* | 5/2015 | Fiala | G06F 21/56 726/23 |
| 2015/0288706 A1* | 10/2015 | Marshall | H04L 63/123 726/23 |
| 2016/0036849 A1* | 2/2016 | Zakian | H04L 63/1441 726/23 |

* cited by examiner

DETECTION OF WEBCAM ABUSE

TECHNICAL FIELD

The present invention relates to detection of webcam abuse on a computer system.

BACKGROUND

The term "malware" is short for malicious software and is used to refer to any software designed to infiltrate or damage a computer system without the owner's informed consent. Malware can include viruses, worms, Trojan horses, rootkits, adware, spyware and any other malicious and unwanted software. Many computer devices, such as desktop personal computers (PCs), laptops, personal data assistants (PDAs) and mobile phones can be at risk from malware. Computer systems running the Windows™ operating system are particularly at risk from malware, but all operating systems will be at some risk. Examples of other operating systems that could be at risk are Mac OS™, Linux™, Android™, iOS™, Windows Mobile™, and Blackberry OS™.

Computers which are compromised with malware can provide unauthorised people or unauthorised devices with access to personal information of the user of the computer. A particular breach of privacy is unauthorised access to a webcam connected to the computer such that an unauthorised person can view and/or capture video and photographs of the user or the room in which the webcam is located without the user of the computer being aware.

Computer users will typically run antivirus (AV) and/or internet security (IS) software applications, for example F-Secure's™ Anti-Virus and Internet Security applications, to detect malware and protect against malware attacks on their computer system. Detecting malware is challenging, as malware is usually designed to be difficult to detect, often employing technologies that deliberately hide the presence and processes of malware on a system. Consequently, anti-virus and internet security applications will use a large number of techniques in order to detect malware effectively, and reduce the risk of any malware going undetected. However, in the case of malware associated with webcam attacks, monitoring all possible methods that can be used to hide webcam use is not efficient and a more efficient detection scheme is required.

Most webcams have an indicating light which is typically switched on if the webcam is in use and is switched off if the webcam is not in use. If the indicating light is on, thereby indicating that the webcam is in use, and the user of the computer is not running an application which makes use of the webcam, such as Skype™, then the user will be able to notice the light and draw the conclusion that the webcam is being used by someone else. However, many webcams allow the user to switch off the light permanently. For example, a simple registry change can be used to switch off the light in Logitech™ cameras. This switch is vulnerable to a malware attack. A further problem of relying on the indicating light in the case of a hardware light, such as in Apple™ laptops, is that cam spies can merely take snapshots rather than video clips. In this case, the light only flashes briefly and the user may not have time to notice the light. Therefore, the webcam light may not, be a reliable means for detecting web spies.

SUMMARY OF THE INVENTION

According to a first aspect of the invention, there is provided a method of detecting unauthorised use of a webcam or a microphone on a computer system, the method comprising, at the computer, identifying a process that is using the webcam or the microphone, determining whether information is visibly displayed by the computer system to indicate to a user the use of the webcam or the microphone by the process, and using a result of the step of determining to identify said process as malware or potential malware.

The step of determining whether information is visibly displayed by the computer system may comprise determining whether or not an application window for said process is displayed on a display of the computer system and the steps of identifying and determining may comprise obtaining information from an operating system of the computer system.

The information may be obtained via one or more application program interfaces, APIs. The method may further comprise determining whether said window uses video or audio. The step of using a result may comprise, if it is determined that said information is visibly displayed by the computer system, then identifying the process as trusted, and, if it is determined that information is not visibly displayed by the computer system, then identifying the process as suspicious. The step of using a result may further comprise verifying the reputation of a process identified as suspicious against a database of trusted and/or untrusted processes in order to determine whether or not the process is malware or potential malware. The method may further comprise sending an alert to the user if the process is identified as malware or potential malware. The method may further comprise switching the webcam or microphone off if the process is identified as malware or potential malware.

According to a second aspect of the invention, there is provided an apparatus for detecting unauthorised use of a webcam or a microphone on a computer system, the apparatus comprising an identifying module for identifying a process using the webcam or the microphone, a determining module for determining whether information is visibly displayed by the computer system to indicate to a user the use of the webcam or the microphone by the process, and a malware identification module for using a result output by said determining module to identify said process as malware or potential malware.

The malware identification module may be arranged to identify the process as trusted if it is determined that said information is visibly displayed by the computer system, and, to identify the process as suspicious if it is determined that information is not visibly displayed by the computer system. The apparatus may further comprise a verifying module for verifying the reputation of a process identified as suspicious against a database of trusted and/or untrusted processes in order to determine whether or not the process is malware or potential malware. The apparatus may further comprise an alert module for sending an alert to the user if the process is identified as malware or potential malware and may also be configured to switch the webcam or microphone off if the process is identified as malware or potential malware.

According to a third aspect of the invention, there is provided a computer system comprising one or more processors, and one or more computer-readable memories storing computer program code, the one or more processors being configured to execute the computer program code to cause the computer system at least to identify a process that is using a webcam or a microphone, determine whether information is visibly displayed by the computer system to indicate to a user the use of the webcam or the microphone by the process, and use a result of the step of determining to identify said process as malware or potential malware.

Optionally, the one or more processors are further configured to execute the computer program code to cause the computer system to identify the process as trusted if it is determined that said information is visibly displayed by the computer system, and, to identify the process as suspicious if it is determined that information is not visibly displayed by the computer system. The one or more processors may further be configured to execute the computer program code to cause the computer system to verify the reputation of a process identified as suspicious against a database of trusted and/or untrusted processes in order to determine whether or not the process is malware or potential malware. The one or more processors may further be configured to execute the computer program code to cause the computer system to send an alert to the user if the process is identified as malware or potential malware. The one or more processors may further be configured to execute the computer program code to cause the computer system to switch the webcam or the microphone off if the process is identified as malware or potential malware.

DETAILED DESCRIPTION

As discussed above, malware may give an unauthorised person or an unauthorised device access to a webcam connected to or integrated into a compromised computer.

This type of attack can be particularly disturbing for victims given the intrusion into their personal space.

A defence against cam spies involves detecting applications which are using or attempting to use a webcam, but which are not associated with a video or photograph on the computer's screen. It is appreciated that this represents suspicious behaviour on the part of an application as, almost always, when a user intends to use a webcam, a video or picture will be displayed on the screen. This video or photograph may not be generated by the computer's webcam itself, but may originate from a peer (remote) webcam as is the case with Internet video calling (e.g. Skype™ calls). At the very least, a graphical user interface, GUI, which is associated with the webcam, for example a Logitech™ window or a as Skype™ window, will be visible to the user on the computer screen, even if that window does not always display a video or photograph.

Figure 1:
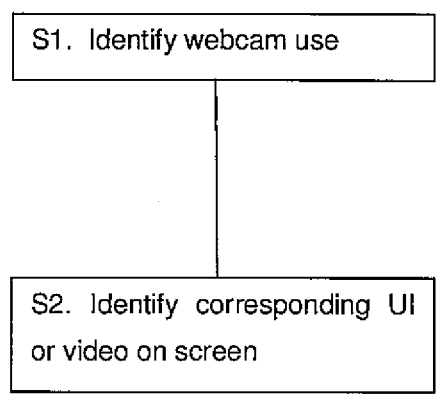
FIG. 1 is a flow diagram illustrating a method of detecting a webcam attack.

FIG. 1 illustrates a method including a first step of identifying webcam use (S1) by a software application sending a request to the operating system to identify all processes which use a webcam associated with the computer. The operating system returns a list of all processes which use the webcam. The software application then sends a request to the operating system to identify those processes (S2) from the list which do not have a GUI visibly displayed on the user screen. If there are processes which do not have a GUI visibly displayed on the user screen, the software application alerts the user of the potential threat of a webcam spy.

The software application is able to distinguish between processes which have a GUI which is displayed on the user screen such that it is visible to the user and processes which do have a GUI displayed on the user screen, but not visible to the user. A GUI which is not visible to the user is, for example, displayed on the user screen too small to be noticed by the user, or has a transparent window, or is otherwise displayed such that it is not visible by the user. The software application is arranged to consider a GUI which is present on the user screen without being visible as possible malware. In particular, the application detects whether or not an application window for said process is displayed on a display of the computer system.

Additionally, the list of processes which use the webcam can be sent to a network server for comparing the list against a database with processes with a known reputation. The result of the comparison is returned to the user. Alternatively, a local database can be maintained at the user's computer, which will need to be updated regularly to stay up to date. The step of comparing the list of processes against a database can be done before or after the step of identifying processes which do not have a GUI visibly displayed on the user screen. If the step of comparing against a database is done after the step of identifying processes which to not have a visible GUI displayed on the screen, the list is possibly shorter and comparing processes with a visible GUI such as Skype™ against a list would be avoided.

Optionally, the software application can send instructions to the operating system to automatically turn the webcam off if no GUI is visibly displayed on the screen and if the reputation cannot be verified against a database or is confirmed to have a bad reputation corresponding to a malware application.

Figure 2:
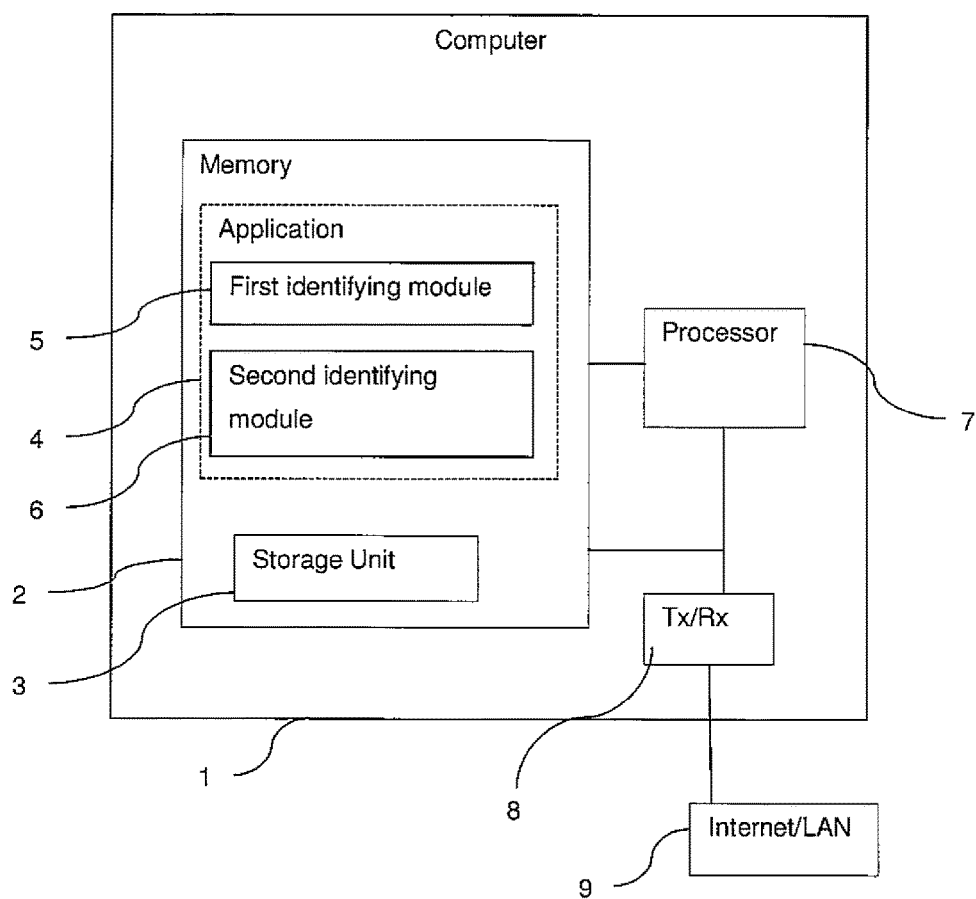
FIG. 2 illustrates a computer configured to detect a webcam attack.

FIG. 2 illustrates a computer (1) including a memory (2) with a storage unit (3). In the memory, an application (4) is installed with a first identifying module (5) and a second identifying module (6). The first identifying module is configured to identify at least one process using the webcam and the second identifying module is configured to identify whether the process which uses the webcam further has a user interface, UI, or a video provided on the user screen of the computer system. The computer further comprises a processor 7 and a transceiver 8 for connecting the computer to a network 9 such as the internet or a local area network (LAN).

In a specific embodiment, a method of detecting a cam spy has a first step of identifying all processes on a computer which use a webcam. For example, all processes can be checked to identify those using a webcam in Windows™ by finding out the device handle corresponding to a webcam and finding out all processes which have an open file handle corresponding to the webcam device handle. More generally, the software application can use operating system application program interfaces (APIs) to instruct the operating system to return to the software application a list of those processes which are using the webcam.

Figure 3:
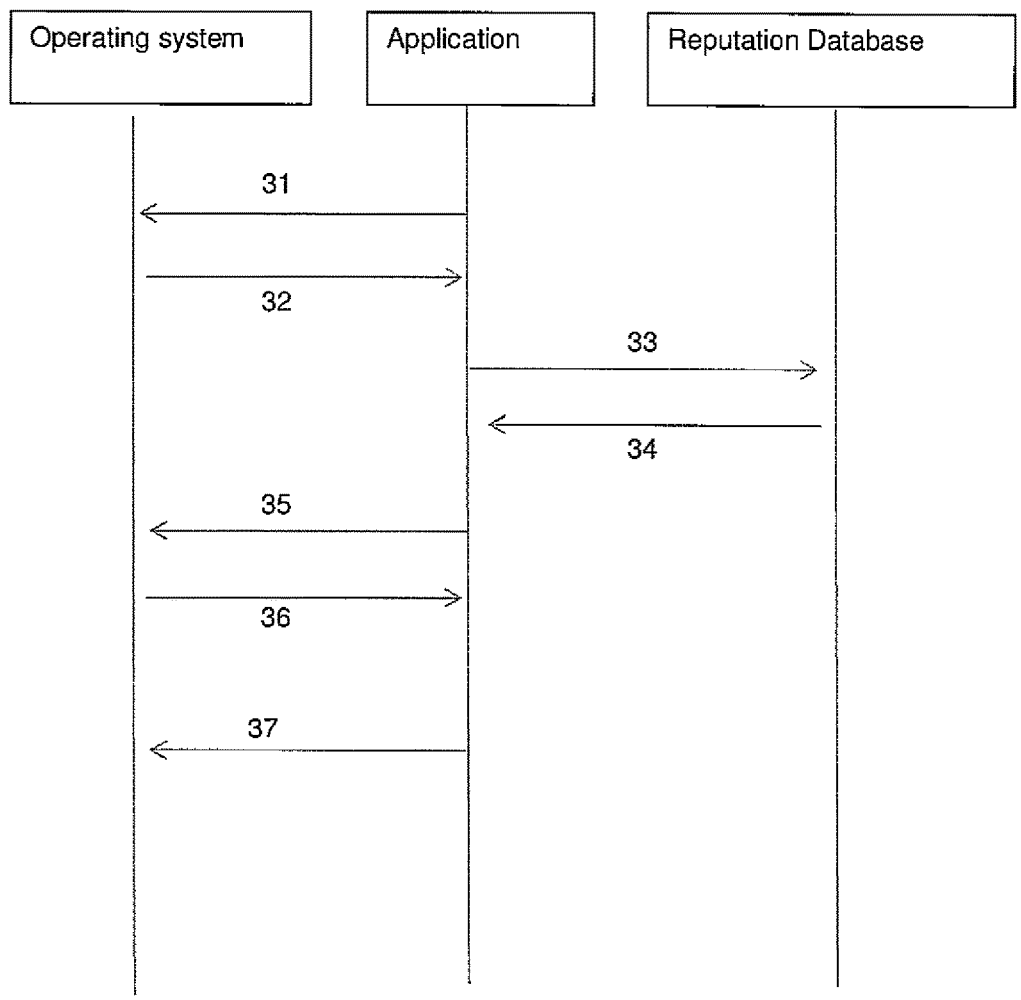
FIG. 3 is a signalling diagram illustrating a method of detecting a webcam attack.

FIG. 3 is a signalling diagram in which the application sends a request for information 31 to the operating system to identify processes using webcams, followed by the operating system returning an answer 32 to the application.

After the processes which use a webcam have been identified, the reputation of those processes is compared against a list of processes maintained at a cloud server to avoid false positives. If those processes which use the webcam are trusted processes, such as Skype™, then the user does not need to be notified and the processes do not need to be indicated as suspicious. If the process is indicated by the server to be known as malware, the user is alerted accordingly. FIG. 3 illustrates sending a request 33 to the reputation database, which is maintained at the cloud server, or, alternatively, at the client computer. The reputation database returns an answer 34 to the application. Steps 33 and 34 may also take place at a later stage, for example after steps 35 and 36 in which the presence of a visible GUI is identified. If steps 33 and 34 take place at a later stage, the list of suspect malware processes may be smaller, and fewer processes need to be reviewed at a database. On the other hand, if steps 33 and 34 take place as indicated in FIG. 3, false positives are excluded and trusted processes are not further investigated by steps 35 and 36.

If the process which has been identified as using a webcam is not in the list of trusted processes maintained at the cloud server, or is otherwise untrusted, then the next step is to check whether the process has a corresponding visible GUI displayed on the user screen and/or whether the GUI includes a video or photograph. The GUI may be an application window for the process which is displayed on a display of the computer system. The software application sends a request to the operating system to return a list of the visible GUIs used by the processes. This step is illustrated as step 35 in FIG. 3 and the answer which is returned by the operating system is illustrated as step 36. The specific implementation depends on the operating system and also on the version of the operating system. By way of example, in Windows™, the IsWindowVisible function could be used to determine the visibility of a window after a window corresponding to the process has been identified. By way of a further example for Windows™, the function GetGuiResources could be used to retrieve the number of handles to GUI objects in use by the specific process. A plurality of functions may be used to retrieve sufficient information for deciding on whether or not a process which uses a webcam also has a GUI on the user screen and whether or not the GUI is visible to a user.

As a further step, the software application requests the operating system to return information on whether the GUI includes a video or a photograph. The presence of a video in a GUI can, for example, be determined by checking libraries and functions imported by the process which displays the GUI. In Windows™, a process which shows a video on the user screen must import VideoRenderer or a different video display library. This step is not separately illustrated in FIG. 3.

If the process does not have a corresponding GUI and does not have a video either, then the process is flagged as suspicious and the user is notified. If the process does have a GUI, but not a video feed, then the user is notified but with a notification indicating a less severe threat than if the process does not have a GUI or video.

Optionally, the application may send instructions to the operating system to turn the webcam off if the process is flagged as suspicious; illustrated as step 37 in FIG. 3. This step may also be included after the steps 33 and 34 of checking the reputation of the process at a server if the reputation is known to be negative.

A webcam may also have a microphone and the method disclosed herein could additionally, or alternatively, identify processes which use the microphone while no corresponding UI is displayed on the user screen. A microphone may also be provided separately from a webcam. The method disclosed herein is also arranged to detect a process which uses a microphone without using a webcam, while no visible GUI associated with the process is displayed on the user screen.

The method disclosed herein could be used in a mobile device such as a mobile phone or a tablet computer.

Although the invention has been described in terms of preferred embodiments asset forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A method of detecting unauthorized use of a webcam or a microphone on a computer system, the method comprising, on the computer system:

monitoring, with an operating system of the computer system, use of the webcam or the microphone;

identifying a process that is using the webcam or the microphone;

determining whether information is visibly displayed on a screen of the computer system, to indicate to a user the use of the webcam by the process or the use of the microphone by the process;

wherein determining whether information is visibly displayed includes determining whether or not an application window or GUI for said process is displayed on the screen of the computer system, when the application window or GUI is displayed, determining if the application window or GUI is too small to be seen by the user or transparent to an extent that the application window or GUI is not visible to the user; and when it is determined that said information is visibly displayed by the process, on the screen of the computer system, then identifying the process as trusted, and, when it is determined that information is not visibly displayed by the process, on the screen of the computer system, then identifying the process as malware or potential malware, sending an alert to the user if the process is identified as malware or potential malware, and switching the webcam or microphone off if the process is identified as malware or potential malware.

2. The method according to claim 1, wherein the steps of identifying and determining comprise obtaining information from the operating system of the computer system.

3. The method according to claim 2, wherein said information is obtained via one or more application program interfaces, APIs.

4. The method according to claim 1, further comprising, at the computer system, determining whether said window uses video or audio.

5. The method according to claim 1, further comprising verifying the reputation of a process identified as malware or potential malware against a database of trusted and/or untrusted processes.

6. A computer system comprising:

one or more processors; and one or more computer-readable memories storing computer program code, the one or more processors being configured to execute the computer program code to cause the computer system at least to:

monitor, with an operating system of the computer system, use of a webcam or a microphone;

identify a process that is using the webcam or the microphone;

determine whether information is visibly displayed on a screen of the computer system, to indicate to a user the use of the webcam or the microphone by the process, wherein determining whether information is visibly displayed includes determining whether or not an application window or GUI for said process is displayed on the screen of the computer system, and, when the application window or GUI is displayed, determining if the application window or GUI is too small to be seen by the user or transparent to an extent that the application window or GUI is not visible to the user;

when it is determined that said information is visibly displayed by the process, on the screen of the computer system, then identifying the process as trusted, and, when it is determined that information is not visibly displayed by the process, on the screen of the computer system, then identifying the process as malware or potential malware, sending an alert to the user if the process is identified as malware or potential malware, and switching the webcam or microphone off if the process is identified as malware or potential malware.

7. The computer system of claim 6, wherein the one or more processors are further configured to execute the computer program code to cause the computer system to verify the reputation of a process identified as malware or potential malware against a database of trusted and/or untrusted processes.

* * * * *